(12) United States Patent
Park et al.

(10) Patent No.: US 8,223,127 B2
(45) Date of Patent: Jul. 17, 2012

(54) VIRTUAL WHEEL INTERFACE FOR MOBILE TERMINAL AND CHARACTER INPUT METHOD USING THE SAME

(75) Inventors: Won-Joo Park, Anyang-si (KR); Hyang Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 793 days.

(21) Appl. No.: 11/804,684

(22) Filed: May 18, 2007

(65) Prior Publication Data

US 2007/0296704 A1 Dec. 27, 2007

(30) Foreign Application Priority Data

Jun. 26, 2006 (KR) .............................. 2006-0057524

(51) Int. Cl.
*G06F 3/02* (2006.01)
(52) U.S. Cl. ....................................... 345/169; 345/156
(58) Field of Classification Search .................... 345/169
See application file for complete search history.

(56) References Cited

U.S. PATENT DOCUMENTS

| | | | | |
|---|---|---|---|---|
| 5,485,197 A * | 1/1996 | Hoarty | ............................. | 725/37 |
| 5,515,486 A * | 5/1996 | Amro et al. | ................... | 715/848 |
| 5,745,717 A * | 4/1998 | Vayda et al. | ................... | 715/834 |
| 5,798,760 A * | 8/1998 | Vayda et al. | ................... | 715/834 |
| 6,011,542 A * | 1/2000 | Durrani et al. | ................ | 345/156 |
| 6,028,600 A * | 2/2000 | Rosin et al. | ................... | 715/718 |
| 6,037,937 A * | 3/2000 | Beaton et al. | ................. | 715/764 |
| 6,072,485 A * | 6/2000 | Barnes et al. | ................. | 715/802 |
| 6,078,739 A * | 6/2000 | Paterson et al. | ............... | 715/835 |
| 6,144,378 A * | 11/2000 | Lee | ............................... | 715/767 |
| 6,266,098 B1 * | 7/2001 | Cove et al. | ..................... | 348/563 |
| 6,285,367 B1 * | 9/2001 | Abrams et al. | ................ | 715/854 |
| 6,448,987 B1 * | 9/2002 | Easty et al. | .................... | 715/834 |
| 6,549,219 B2 * | 4/2003 | Selker | ........................... | 715/834 |

(Continued)

FOREIGN PATENT DOCUMENTS

JP 2003-150303 5/2003

(Continued)

OTHER PUBLICATIONS

Acoustic Safety of Terminal Equipment (TE); An Investigation on Standards and Approval Documents, ETSI TR 101 800 V1.1.1, Jul. 2000.

*Primary Examiner* — Nitin Patel
*Assistant Examiner* — Dorothy Harris
(74) *Attorney, Agent, or Firm* — The Farrell Law Firm, P.C.

(57) ABSTRACT

A virtual wheel interface structure of a mobile terminal having a wheel input unit and a character input. A virtual keypad in a wheel shape is displayed on a display unit adjacent to the wheel input unit having a wheel, a selection, and navigation keys. The virtual wheel keypad includes a plurality of virtual keys disposed in the wheel rotation direction. A screen highlight and a cursor are displayed on the display unit. The screen highlight is located at a specific position on the virtual wheel keypad to select a virtual key, and the cursor indicates a character input position. If the wheel key rotates, the virtual wheel keypad rotates correspondingly and the screen highlight is located at a specific virtual key. A character allocated to the virtual key in the screen highlight is input by pressing the selection key or a navigation key, or by rotating the wheel key.

22 Claims, 12 Drawing Sheets

U.S. PATENT DOCUMENTS

| | | | |
|---|---|---|---|
| 6,744,427 B2 * | 6/2004 | Maglio et al. | 345/184 |
| 6,961,912 B2 * | 11/2005 | Aoki et al. | 715/863 |
| 7,036,091 B1 * | 4/2006 | Nguyen | 715/834 |
| 7,111,788 B2 * | 9/2006 | Reponen | 345/169 |
| 7,385,592 B2 * | 6/2008 | Collins | 345/173 |
| 7,574,672 B2 * | 8/2009 | Jobs et al. | 715/834 |
| 7,616,764 B2 * | 11/2009 | Varghese et al. | 380/255 |
| 7,716,603 B2 * | 5/2010 | Boyden | 715/834 |
| 2002/0016918 A1 * | 2/2002 | Tucker et al. | 713/190 |
| 2003/0073456 A1 * | 4/2003 | Griffin et al. | 455/550 |
| 2003/0076306 A1 * | 4/2003 | Zadesky et al. | 345/173 |
| 2003/0095096 A1 * | 5/2003 | Robbin et al. | 345/156 |
| 2003/0156146 A1 * | 8/2003 | Suomela et al. | 345/864 |
| 2004/0070567 A1 * | 4/2004 | Longe et al. | 345/156 |
| 2004/0090315 A1 * | 5/2004 | Mackjust et al. | 340/426.13 |
| 2004/0201576 A1 * | 10/2004 | Shimada et al. | 345/173 |
| 2006/0028454 A1 * | 2/2006 | Branton et al. | 345/173 |
| 2007/0180504 A1 * | 8/2007 | Hung | 726/5 |
| 2008/0062128 A1 * | 3/2008 | Brodersen et al. | 345/158 |
| 2008/0066135 A1 * | 3/2008 | Brodersen et al. | 725/134 |

FOREIGN PATENT DOCUMENTS

| | | |
|---|---|---|
| KR | 1020040023329 | 3/2004 |
| KR | 1020040026557 | 3/2004 |
| KR | 2006-0009906 | 2/2006 |
| WO | WO 2004100510 A1 * | 11/2004 |

* cited by examiner

VIRTUAL WHEEL INTERFACE FOR MOBILE TERMINAL AND CHARACTER INPUT METHOD USING THE SAME

PRIORITY

This application claims priority to an application entitled "Virtual Wheel Interface For Mobile Terminal And Character Input Method Using The Same" filed in the Korean Intellectual Property Office on Jun. 26, 2006 and assigned Serial No. 2006-0057524, the contents of which are incorporated herein by reference.

BACKGROUND OF THE INVENTION

1. Field of the Invention

The present invention relates to a user interface and an input method for a mobile terminal, and more particularly, to a virtual wheel interface structure of a mobile terminal having a wheel input unit and to a character input method using a virtual wheel interface.

2. Description of the Prior Art

With recent developments in the technologies of integrated circuits for semiconductors and of information and communication, various mobile terminals such as a mobile phone, PDA (personal digital assistants), MP3 player, digital camera, and PMP (portable multimedia player), have become widely available. Most of all, mobile terminals are small in size allowing users to conveniently carry them. In the case of a mobile terminal adopting an input device such as a conventional keyboard system, there are inevitably various limitations in human engineering and design.

For this reason, some mobile terminals such as an MP3 player and a PMP omit a character input function, and optimize operational functions (for example, menu selection or musical selection) by using a navigation key and a wheel key as input units. However, according to a recent trend in the integration of specific functions of terminals, adoption of a character input function is required even for mobile terminals currently having no character input function. Further, as competition becomes more intense, mobile terminal manufacturers are endeavoring to improve the competitiveness of their products by adopting character input function.

SUMMARY OF THE INVENTION

The present invention has been made in view of the above problems, and an object of the present invention is to provide an interface structure enabling convenient character input in a mobile terminal having a wheel input unit, and a character input method using the same.

Another object of the present invention is to provide an excellent visual user interface with an appearance consistent with that of a mobile terminal having a wheel input unit.

Another object of the present invention is to improve menu extendibility and product competitiveness of a mobile terminal having a wheel input unit.

In order to achieve the above objects, the present invention provides a virtual wheel interface structure for a mobile terminal having a wheel input unit, and a character input method using a virtual wheel interface.

A virtual wheel interface structure according to the present invention includes a display unit, wheel input unit, virtual wheel keypad, highlighted area of a screen (hereinafter screen highlight), and cursor. The display unit is formed in a first area of the mobile terminal, and the wheel input unit is formed in a second area of the mobile terminal adjacent to the display unit. The wheel input unit includes a wheel key rotating in the clockwise and counter-clockwise directions, a selection key disposed in the center of the wheel key, and navigation keys disposed around the wheel key. The virtual wheel keypad includes a plurality of virtual keys disposed in the wheel rotation direction, and is displayed on the display unit in a wheel form corresponding to a portion of the wheel key. The screen highlight and the cursor are displayed on the display unit. The screen highlight is displayed at a specific position on the virtual wheel keypad of the display unit and indicates a selection status of a virtual key. The cursor is displayed on the display unit and indicates a character input position.

In the virtual wheel interface structure, the cursor may be located outside the virtual wheel keypad or inside the screen highlight. Preferably, the first area is larger than the second area, and the virtual wheel keypad is displayed in a partial area of the display unit adjacent to the wheel input unit.

The plurality of virtual keys may be divided into a plurality of types, wherein the type includes upper case characters, lower case characters, numbers, and symbols. The virtual wheel keypad includes a plurality of tracks, and all of the virtual keys of each type are disposed on a different track. Each character may be allocated to a different virtual key, or a plurality of characters may be allocated to each virtual key.

The virtual wheel keypad may rotate in the clockwise or counter-clockwise direction corresponding to the rotation of the wheel key, and the screen highlight may rotate in the clockwise or counter-clockwise direction corresponding to the rotation of the wheel key.

A character input method according to the present invention utilizes a virtual wheel interface in a mobile terminal having a wheel key rotating in the clockwise and counter-clockwise directions, a selection key disposed in the center of the wheel key, and navigation keys disposed around the wheel key.

The character input method includes displaying a virtual wheel keypad on a display unit of the mobile terminal, wherein the virtual wheel keypad is formed in a wheel shape corresponding to a portion of the wheel key and has a plurality of virtual keys disposed in the rotation direction of the wheel; displaying a screen highlight at a specific position on the virtual wheel keypad to select one of the virtual keys and displaying a cursor at a specific position on the display unit to indicate a character input position; identifying whether the wheel key rotates; rotating the virtual wheel keypad corresponding to the rotation of the wheel key; selecting a virtual key located at the screen highlight from the virtual keys; and inputting a character allocated to the selected virtual key at the position of the cursor.

In selecting a virtual key, it is identified whether the navigation key is pressed, and, if the navigation key is pressed, a virtual key located at the screen highlight is selected. Alternatively, it is identified whether a predetermined time has elapsed, and, if the predetermined time has elapsed, a virtual key located at the screen highlight is selected.

In displaying a virtual wheel keypad, the virtual wheel keypad is preferably displayed in a partial area of the display unit adjacent to the wheel input unit. Preferably, a plurality of tracks is displayed on the virtual wheel keypad, and the virtual keys sorted by types may be disposed on the tracks. Display forms of the tracks are different from each other.

In displaying a cursor, the cursor may be displayed outside the virtual wheel keypad cursor or inside the screen highlight. Inputting a character may utilize one of a single-tap system, a multi-tap system, a dictionary system, and a code system.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

Definition of Terms

Some terms used in this specification are defined as follows.
1. 'Character' includes alphanumeric characters, and all other symbols that can be input by an input means.
2. 'Single-tap system' is an input system in which each character is allocated to a different key, and a key is pressed once to input a character.
3. 'Multi-tap system' is an input system in which several characters are allocated to a key, and a key is pressed several times to find and input a character.
4. 'Dictionary system' is an input system taking advantage of the single-tap system and multi-tap system. In this system, several keys are allocated to each key as in the multi-tap system, but a character is input by pressing a key once as in the single-tap system. A user does not need to find a desired character, and a word registered in a dictionary is automatically searched according to a combination of characters allocated to a key. For example, the 'Text on 9 keys (T9)' system is well known.
5. 'Code system' is not for inputting a word or a sentence, but is an input system for simply inputting a predetermined set of characters. This method is used for inputting a secret code or a password.

Virtual Wheel Interface Structure

Figure 1:
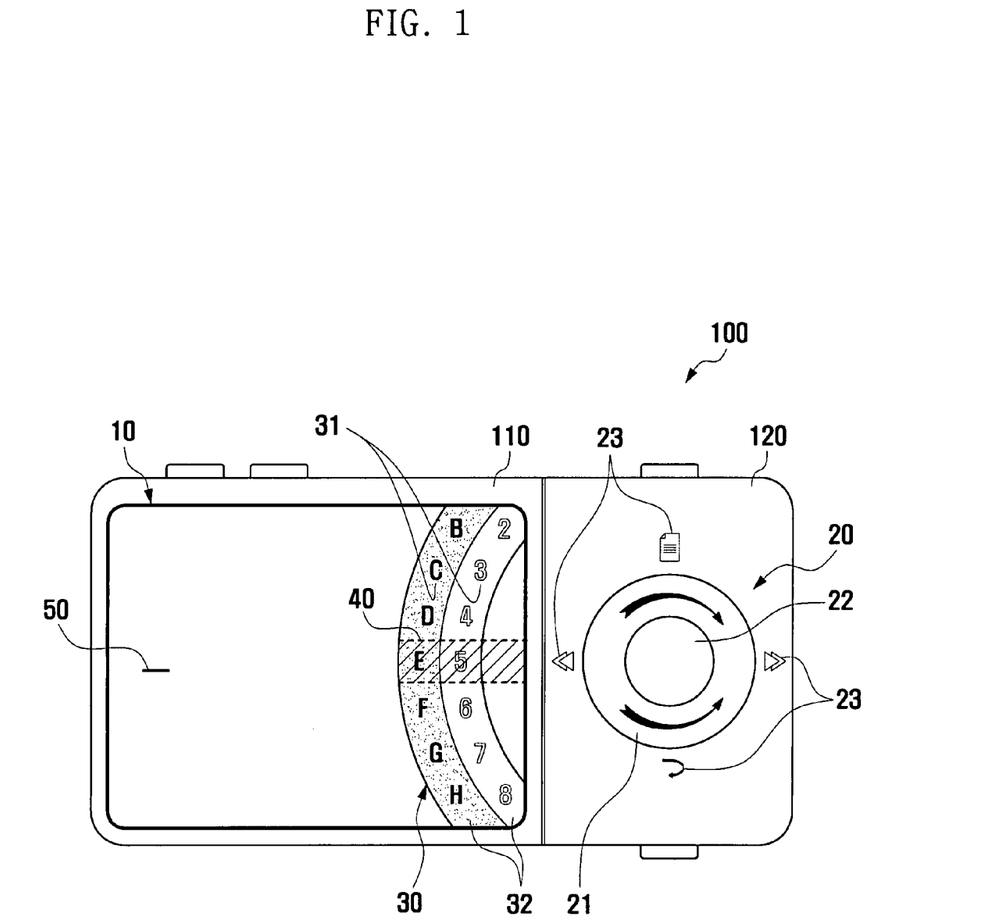
FIG. 1 shows the structure of a virtual wheel interface in a mobile terminal according to the present invention.

Referring to FIG. 1, a face of the mobile terminal 100 is divided into a first area 110 and a second area 120 adjacent to each other. A display unit 10 is formed on the first area 110, and a wheel input unit 20 is formed on the second area 120. The virtual wheel interface structure according to the present invention is suitable for a mobile terminal 100 in which the size of the first area 110 is larger than that of the second area 120.

The display unit 10 may be a conventional display unit such as an LCD (liquid crystal display), PDP (plasma display panel), or OLED (organic light emitting diodes).

The wheel input unit 20 includes a wheel key 21, selection key (or OK key) 22, and navigation keys 23. The wheel key 21 can rotate in the clockwise and counter-clockwise directions. The selection key 22 and navigation keys 23 are disposed, respectively, in the center and around the wheel key 21, and detect a user's pressing motion. At least two navigation keys 23 (for example, four navigation keys) are formed, and additional functions may be set to some navigation keys 23 in addition to their basic function of direction change.

A virtual wheel keypad 30 is displayed on the screen of the display unit 10. The virtual wheel keypad 30 is formed as a wheel corresponding to a portion of the wheel key 21. Preferably, the virtual wheel keypad 30 is displayed at a partial area of the display unit 10 adjacent to the wheel input unit 20. For example, in the case that the wheel input unit 20 is located at the right side of the display unit 10 as shown in FIG. 1, the virtual wheel keypad 30 is displayed in the right area of the display unit 10 located to the left of the wheel key 21. If the wheel input unit is located under the display unit, the virtual wheel keypad may be displayed in the bottom area of the display unit located above the wheel key.

The virtual wheel keypad 30 includes a plurality of virtual keys 31 disposed in a sequential form in the wheel rotation directions (up and down directions in FIG. 1). The virtual key 31 may be classified into at least two types such as upper case characters, lower case characters, numbers, and symbols. The virtual wheel keypad 30 may include at least two tracks 32, and the tracks 32 are disposed in a wheel form adjacent to each other. In the case that the number of tracks 32 is more than one, different types of the virtual keys 31 are preferably disposed on different tracks 32. FIG. 1 shows an example in which virtual keys of upper case characters are disposed on the left track and virtual keys of numbers are disposed on the right track.

All types of the virtual key 31 do not have to be displayed on the screen of the display unit 10 at the same time. In FIG. 1, the upper case characters and numbers may be switched to lower case characters and symbols by a predetermined method. A plurality of characters are allocated to the virtual keys 31. FIG. 1 shows an example in which one character is allocated to each virtual key 31.

A screen highlight 40 and a cursor 50 are displayed on the screen of the display unit 10. The screen highlight 40 is located at a specific position (for example, in the center) on the virtual wheel keypad 30, and indicates that a virtual key 31 therein may be selected. The cursor 50 indicates a character input position, and is located on the screen of display unit 10. As shown in FIG. 1, the cursor 50 may be located outside the virtual wheel keypad 30. However, the cursor may be located inside the screen highlight according to another aspect, which will be described later.

The virtual wheel keypad 30 may rotate in the clockwise or counter-clockwise direction corresponding to the rotation of the wheel key 21. At this moment, the screen highlight 40 does not rotate but remains in a fixed position. Conversely, the screen highlight 40 may rotate according to the rotation of the wheel key 21 and the virtual wheel keypad 30 may remain in a fixed position. By combining these two methods, the virtual wheel keypad 30 may start to rotate when the screen highlight 40 comes to a location at the top or bottom of the screen of the display unit 10 while rotating.

A character input method using a virtual wheel interface according to the present invention is now described.

Character Input Method

Figure 2:
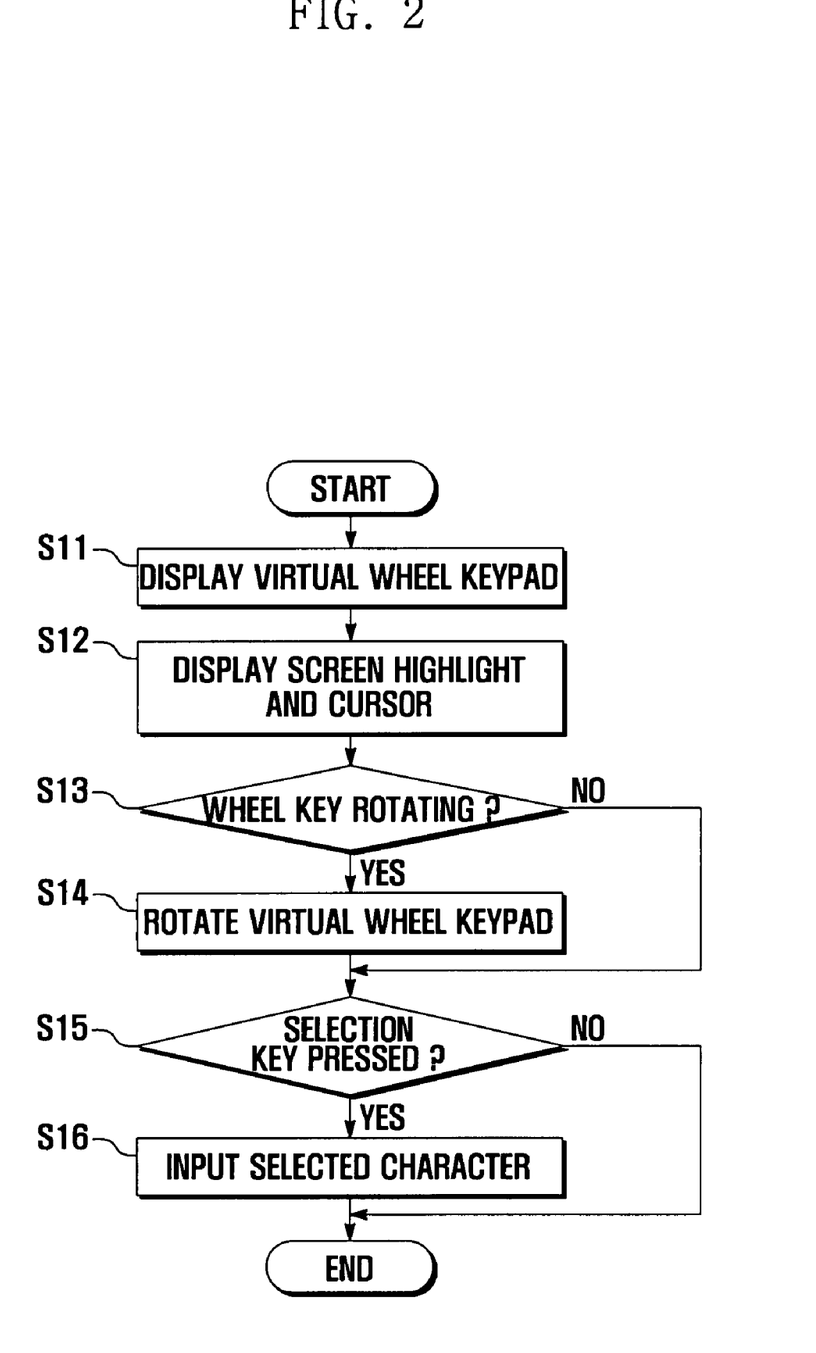
FIG. 2 is a flow chart showing a character input method using a virtual wheel interface according to the present invention.
Figure 3A:
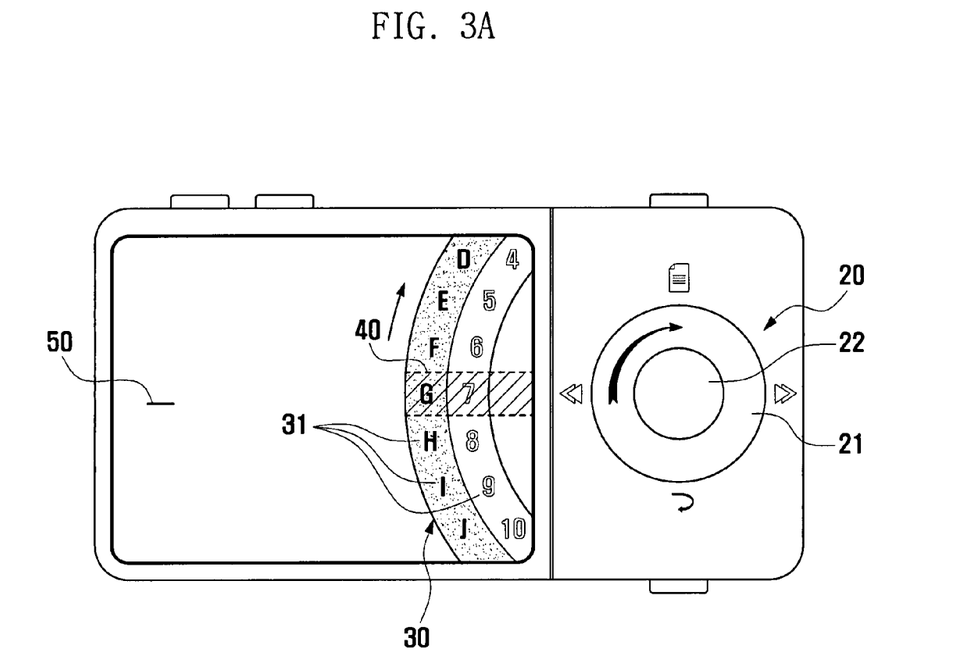
FIGS. 3A and 3B are views showing an example of operation in a character input method using a virtual wheel interface according to the present invention.
Figure 3B:
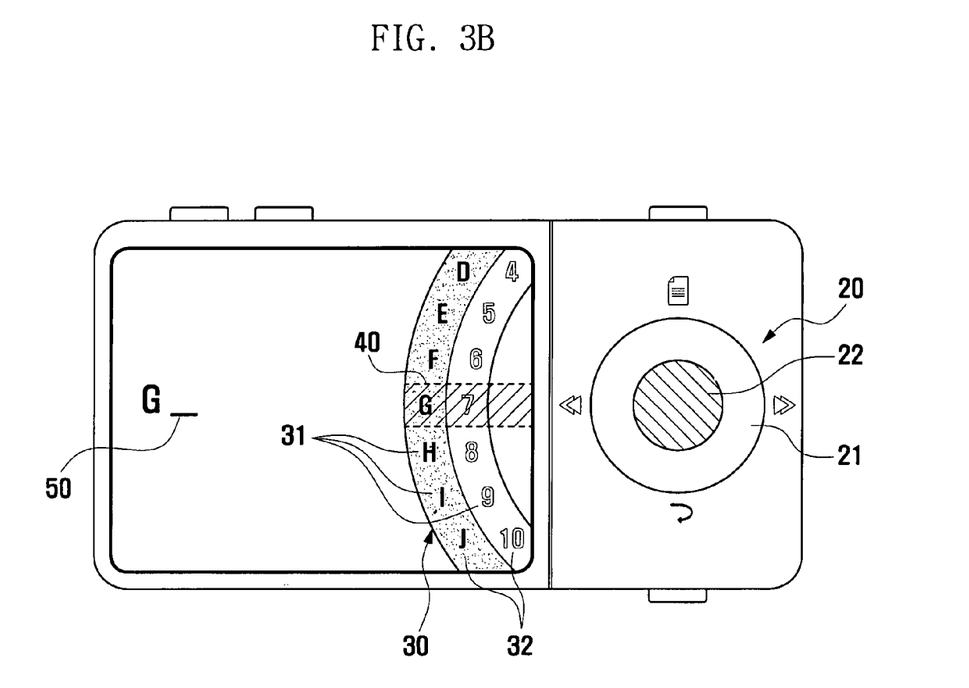

FIG. 2 is a flow chart showing a character input method using a virtual wheel interface according to the present invention. FIGS. 3A and 3B show an example of operation in a character input method using a virtual wheel interface according to the present invention.

Firstly, a virtual wheel keypad 30 is displayed on a display unit 10 of a mobile terminal 100 as shown in FIG. 1 in step S11. Subsequently or simultaneously, a screen highlight 40 and a cursor 50 are displayed on the display unit 10 in step S12. The screen highlight 40 indicates a specific position on the virtual wheel keypad 30 to select a virtual key 31, and the cursor 50 indicates a specific position on the display unit 10 to show a character input position.

Subsequently, it is identified whether a wheel key 21 rotates in step S13. If the wheel key 21 rotates as shown in FIG. 3A, the virtual wheel keypad 30 rotates correspondingly in step S14, alternatively, the screen highlight 40 may rotate instead of the virtual wheel keypad 30.

After the rotation of the virtual wheel keypad 30, or if the wheel key 21 does not rotate, it is identified whether a selection key 22 is pressed in step S15. If the selection key 22 is pressed as shown in FIG. 3B, a virtual key located at the screen highlight 40 is selected from virtual keys 31, and a character allocated to the selected virtual key is input at the position of the cursor 50 in step S16. The input character is displayed at the position of the cursor 50, and the cursor 50 moves to the next input position. In another aspect, the virtual key 31 may be selected by pressing a navigation key 23 (for example, right navigation key) instead of the selection key 22, or the virtual key 31 may be automatically selected if a predetermined time (for example, 1 second) elapses since rotating the virtual wheel keypad.

Hereinafter, character input methods according to the present invention are described in more detail referring to views showing operational examples.

Single-Tap System

This aspect relates to a single-tap system in which each character is allocated to a different virtual key.

Figure 4A:
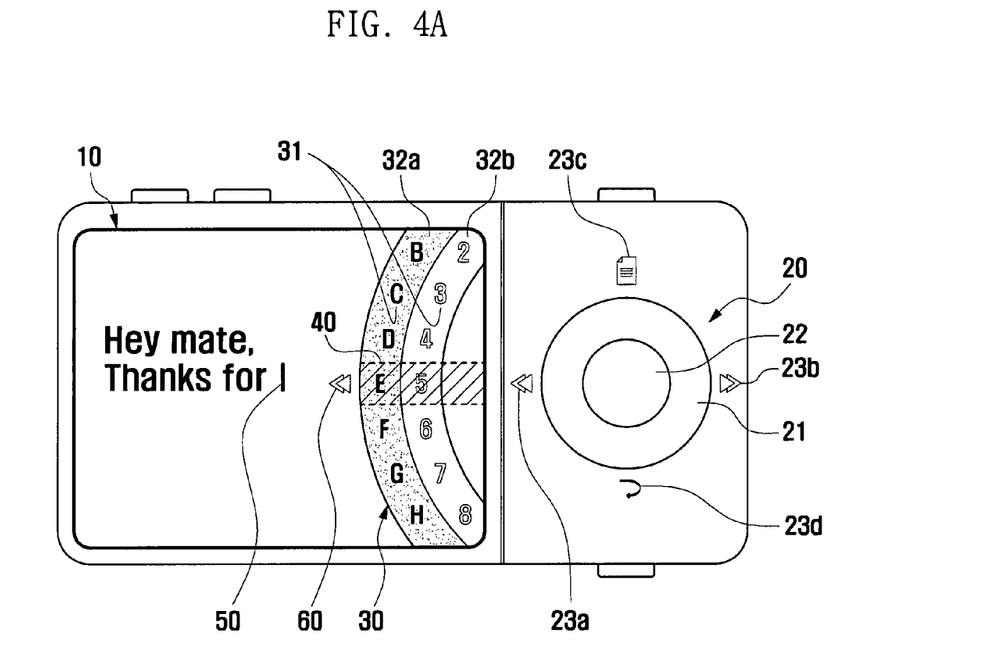
FIGS. 4A to 4F show an example of operation in a character input method according to the present invention.

Referring to FIG. 4A, the virtual wheel keypad 30 has two tracks 32a and 32b. Virtual keys 31 of upper case characters are disposed on the left track 32a, and virtual keys 31 of numerals are disposed on the right track 32b. The left track 32a is displayed darker than the right track 32b, indicating that the virtual keys 31 of upper case characters located on the left track 32a are currently activated as input subjects. An activated track is preferably displayed in a different form (for example, color, brightness, and thickness of a character) from other tracks.

The screen highlight 40 is located at a specific position on the virtual wheel keypad 30 and indicates that the virtual key 31 therein is selected. The cursor 50 is located outside the virtual wheel keypad 30, namely, in a message text, and indicates a character input position.

A virtual wheel interface structure according to the present invention has an input mode and a cursor mode. The input mode state is when screen highlight 40 is activated and displayed. In the input mode, a desired character may be selected or the type of the virtual keys 31 may be changed by rotating the virtual wheel keypad 30. In the cursor mode, the screen highlight 40 disappears and the cursor 50 is activated by starting to blink. In the cursor mode, the cursor 50 may move to a position for inputting a character. FIG. 4A shows an example of the input mode. A virtual navigation key 60 in FIG. 4A has the same shape as a left navigation key 23a. The virtual navigation key 60 indicates that the mode may be changed by pressing left navigation key 23a.

Figure 4B:
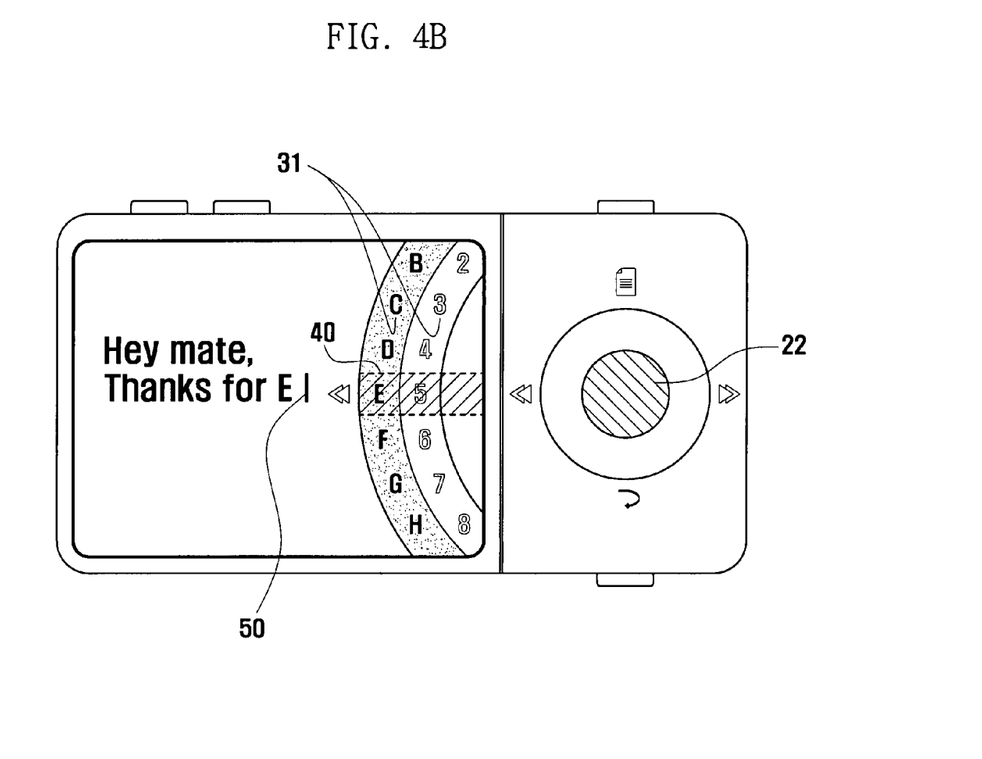

FIG. 4B shows how to input a character by pressing the selection key 22. IF the selection key 22 is pressed, a character (for example, 'E') allocated to the virtual key 31 in the screen highlight 40 is input. After the character is input, the cursor 50 moves to the next input position.

Figure 4C:
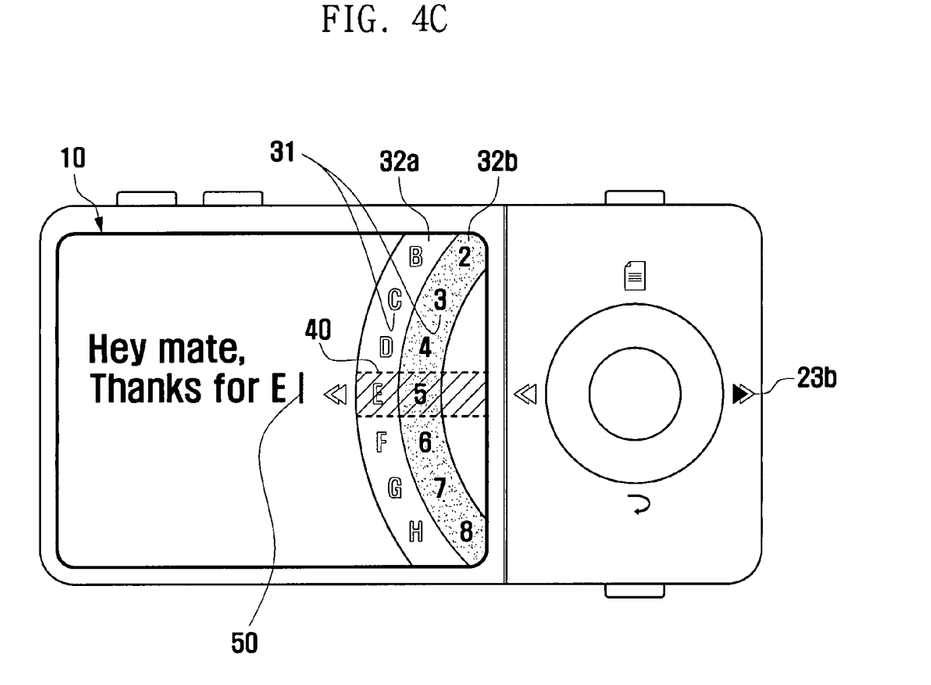

FIG. 4C shows how to change the type of the virtual keys 31 by pressing a right navigation key 23b. If the right navigation key 23b is pressed when the current input subjects are upper case characters located on the left track 32a, the input subjects are changed to numerals on the right track 32b. At the same time, display types of the tracks 32a and 32b are changed and the right track 32b is activated. There may be other types of virtual keys 31 not displayed on the screen of the display unit. If the navigation key 23b is pressed once more when the right-most track 32b is activated, a hidden type of virtual keys may be displayed.

Figure 4D:
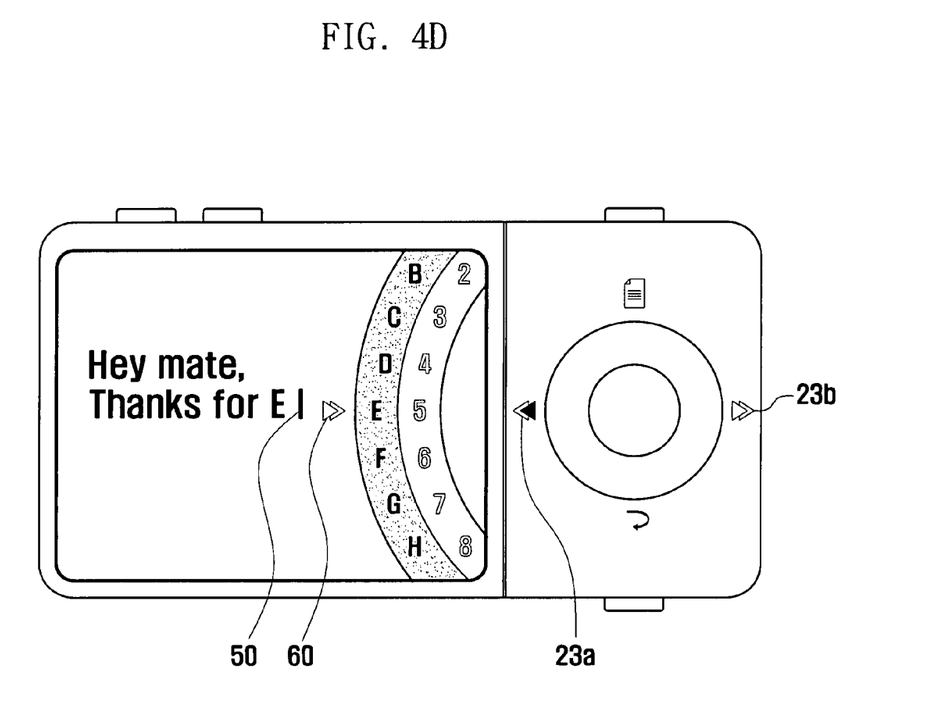

FIG. 4D shows how to change a mode by pressing the left navigation key 23a. If the left navigation key 23a is pressed when the right-most track 32b is activated, the input mode changes to cursor mode, the screen highlight 40 located on the virtual wheel keypad 30 disappears, and the cursor is activated by starting to blink. A virtual navigation key 60 has the same shape as the right navigation key 23b.

Figure 4E:
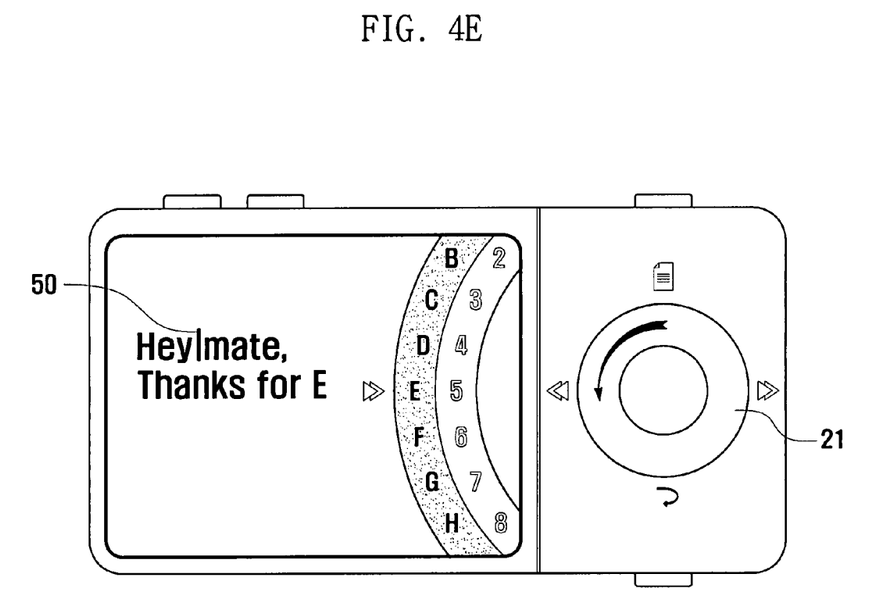

FIG. 4E shows how to move the cursor 50 in the cursor mode. If the wheel key 21 rotates, the cursor 50 moves to a message text accordingly. For example, if the wheel key 21 rotates in the clockwise direction, the cursor 50 moves in the lower right direction, and if the wheel key 21 rotates in the counter-clockwise direction, the cursor 50 moves in the upper left direction.

Figure 4F:
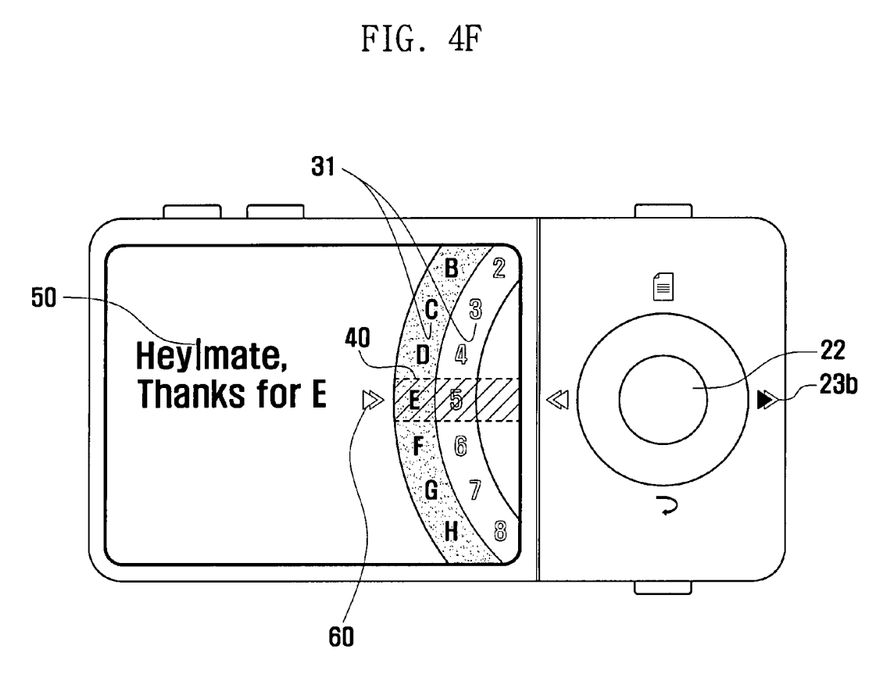

FIG. 4F shows how to change the cursor mode back to the input mode by pressing the right navigation key 23b in the cursor mode. Subsequently, if the selection key 22 is pressed, a character allocated to the virtual key 31 in the screen highlight 40 is input at a new position of the cursor 50.

Although not illustrated in the drawings, other major functions such as 'delete' may be allocated to separate hard keys or to the virtual wheel keypad.

Multi-Tap System

This aspect of the invention relates to a multi-tap system in which several characters are allocated to each virtual key.

Figure 5A:
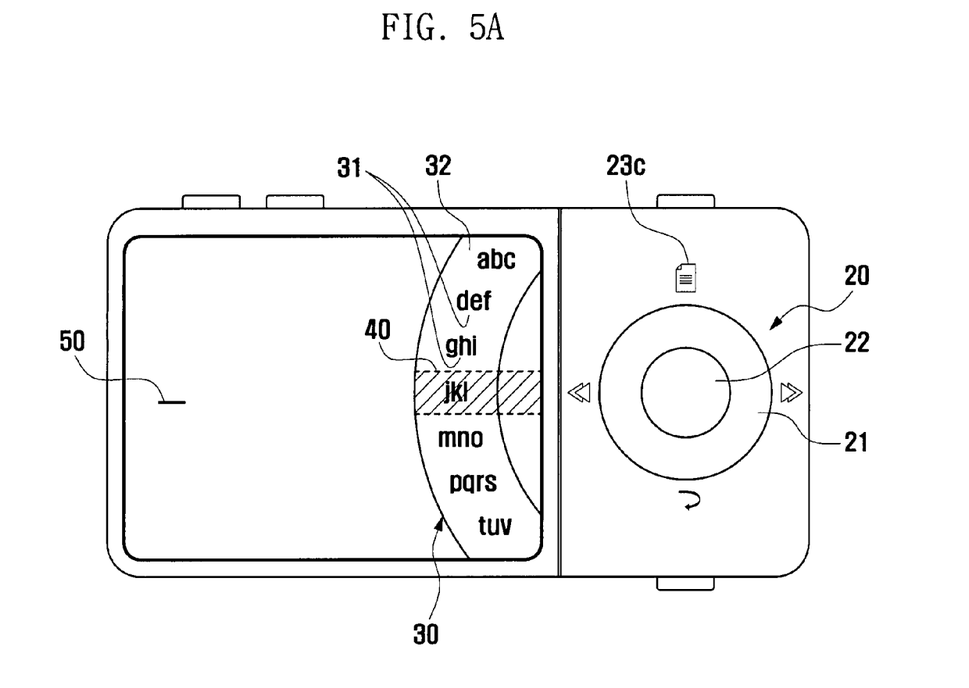
FIGS. 5A to 5C show an example of operation in a character input method according the present invention.

Referring to FIG. 5A, the virtual wheel keypad 30 has one track 32, and only one type of virtual key 31 is displayed on the virtual wheel keypad 30. The display type of the virtual keys 31 may be changed by pressing, for example, an upper navigation key 23c.

Figure 5B:
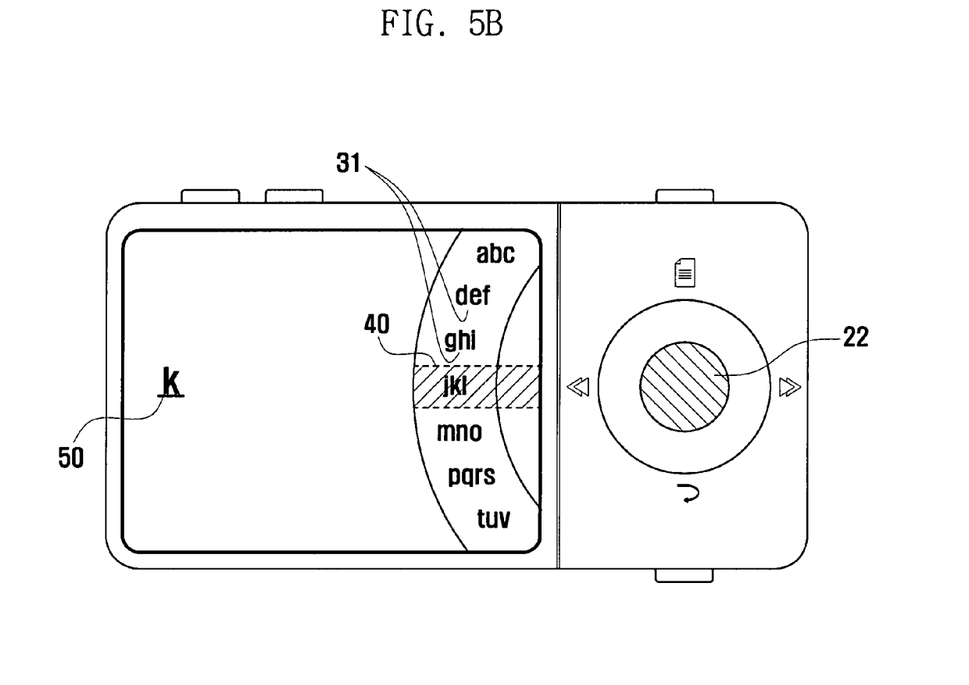

FIG. 5B shows how to input a character by pressing the selection key 22 several times in the multi-tap system. Several characters are allocated to each virtual key 31 located at the screen highlight 40, and a character to be input continuously changes whenever the selection key 22 is pressed. For example, if the selection key 22 is pressed twice when screen highlight 40 is located on the virtual key 31 allocated with 'jkl', 'k' appears at the position of the cursor 50. If the selection key 22 is pressed once more, 'l' appears.

Figure 5C:
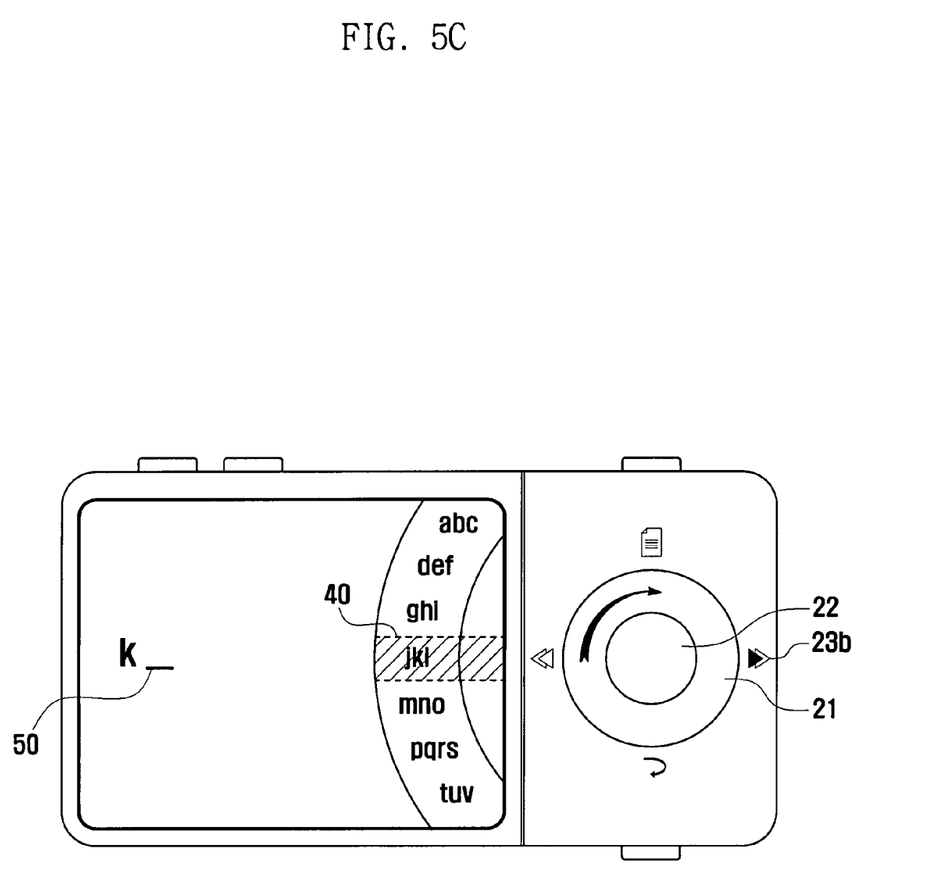

FIG. 5C shows how to determining a character input. If a predetermined time (for example, 1 second) elapses after inputting a character by pressing the selection key 22, the cursor 50 moves to the next input position. Instead of waiting for the predetermined time, the cursor 50 may be moved by pressing a specific key (for example, the right navigation key 23b) or by rotating the wheel key 21 in the clockwise direction.

Dictionary System

This aspect of the invention relates to a dictionary system in which a character is input by pressing a virtual key only once even though several characters are allocated to each virtual key.

Figure 6A:
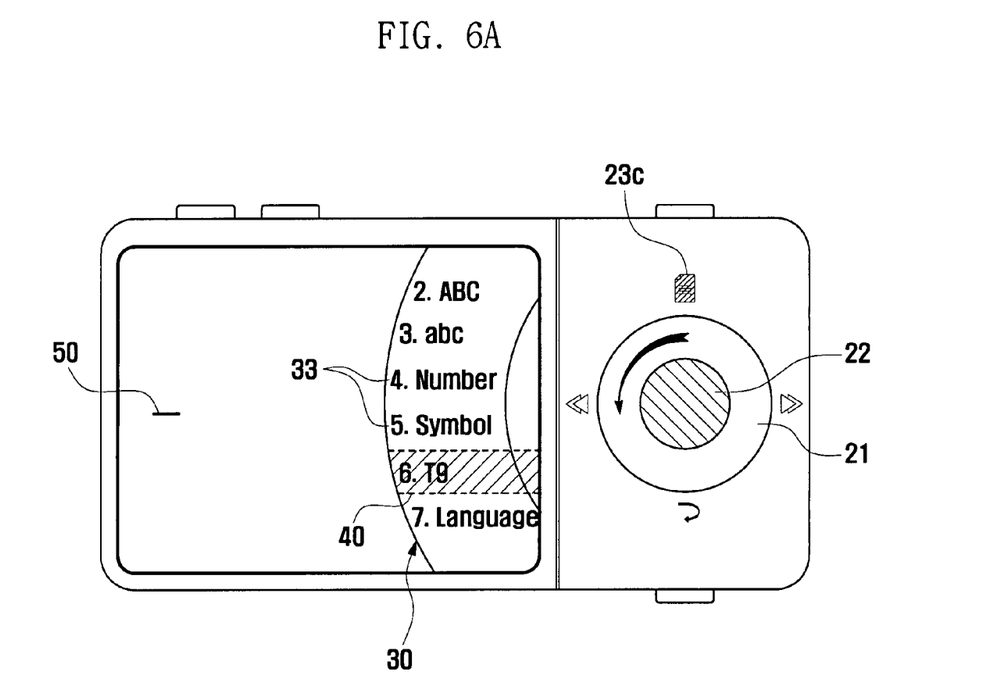
FIGS. 6A to 6D show an example of operation in a character input method according the present invention.

Referring to FIG. 6A, a type of a virtual key and a character input method may be displayed as an option list 33 in an option window. The option window appears in the virtual wheel keypad 30 if the upper navigation key 23c is pressed. If the wheel key 21 rotates, the screen highlight 40 rotates in the virtual wheel keypad 30 (i.e. in the option window). The type of virtual keys or character input method are selected by pressing the selection key 22 after locating the screen highlight 40 at an option to be selected from the option list.

The same virtual keys 31 are listed on the virtual wheel keypad 30 as with the multi-tap system. However, a character located at the position of the screen highlight 40 is input by pressing the selection key 22 only once. For example, a word 'of' is input by locating the screen highlight 40 at 'mno' and pressing selection key 22. In this case, 'm' is displayed at the position of the cursor 50.

Figure 6B:
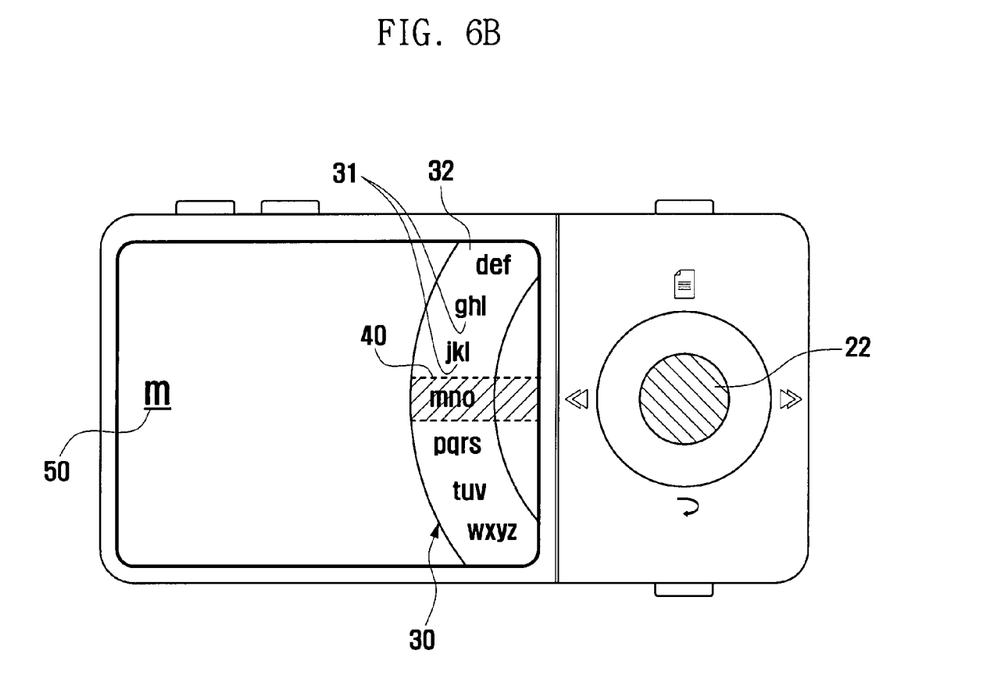

After inputting the first character, if the cursor 50 moves to a second character input position, the virtual wheel keypad 30 is rotated by rotating the wheel key 21. When the screen highlight 40 is located at the desired virtual key 31, the second character is input by pressing the selection key 22. For example, if the selection key 22 is pressed after locating the screen highlight 40 at 'def', among the possible combinations of the first input key 'mno' and second input key 'def', words available in a dictionary (for example, 'of' and 'me') are automatically displayed at the position of the cursor 50.

Figure 6C:
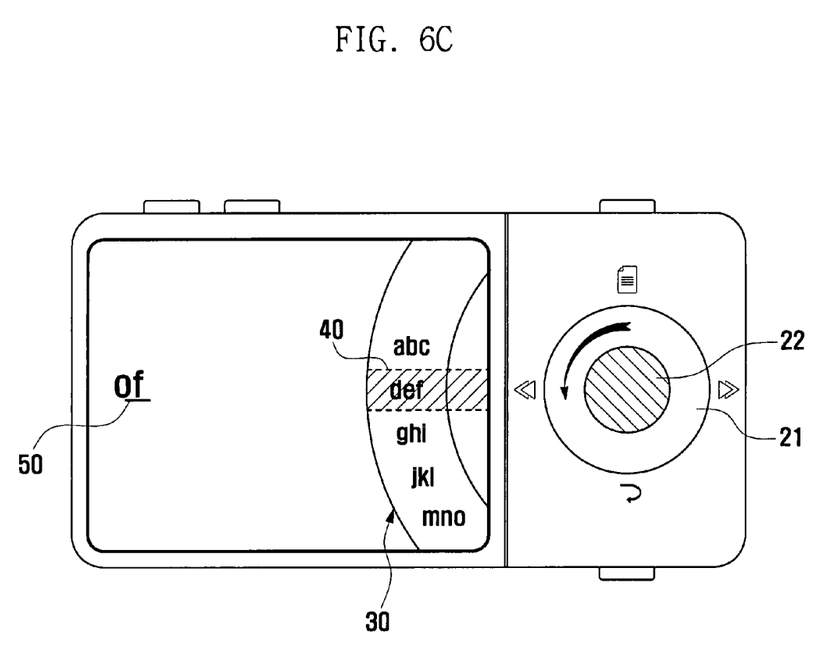
Figure 6D:
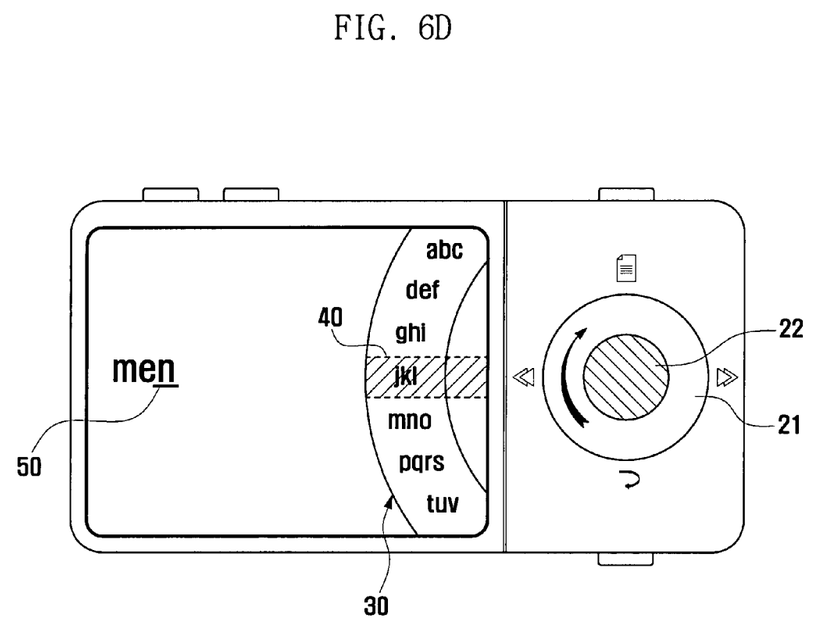

When the cursor 50 moves to a third character input position, the screen highlight 40 is located at a desired position by rotating the wheel key 21, and the selection key 22 is pressed again. For example, if the selection key 22 is pressed after locating the screen highlight 40 at 'mno', among the possible combinations of 'mno', 'def', and 'mno', words available in a dictionary (for example, 'men' and 'neo') are automatically displayed at the position of the cursor.

Code System

This aspect of the invention relates to a code system in which a predetermined set of characters are simply input by using virtual keys allocated with a character.

Figure 7A:
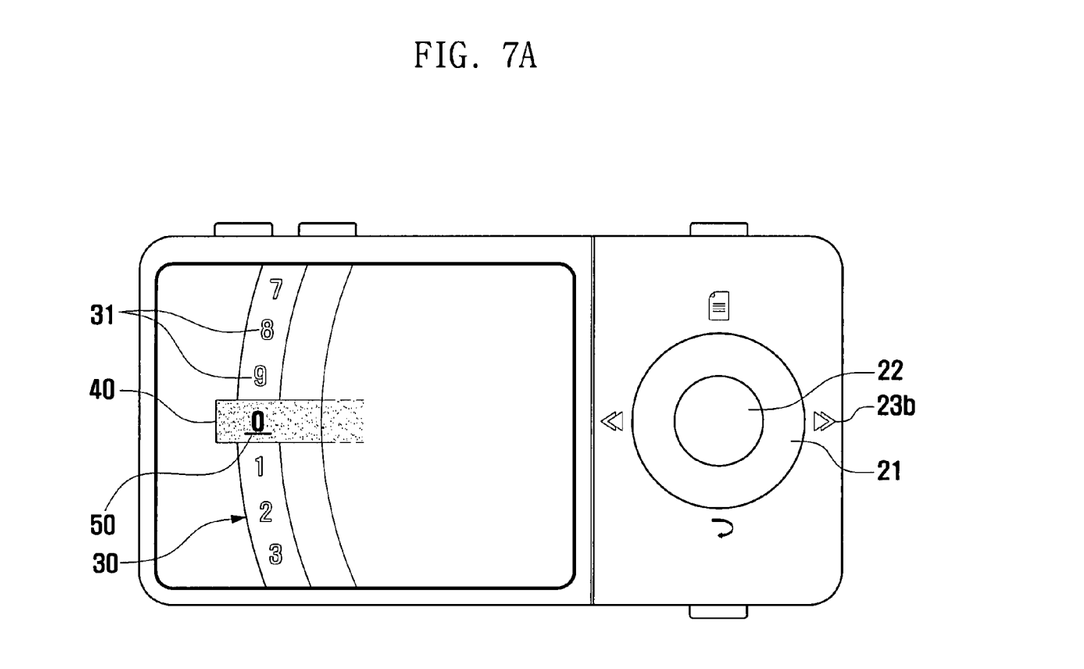
FIGS. 7A to 7D show an example of operation in a character input method according to the present invention.

Referring to FIG. 7A, the cursor is located in the screen highlight 40, whereas the cursor is located outside the virtual wheel keypad 30 as previously described. The virtual keys 31 may be displayed in the virtual wheel keypad 30 by rotating the wheel key 21, and the cursor 50 is located at the virtual key 31 that is in the screen highlight 40.

Figure 7B:
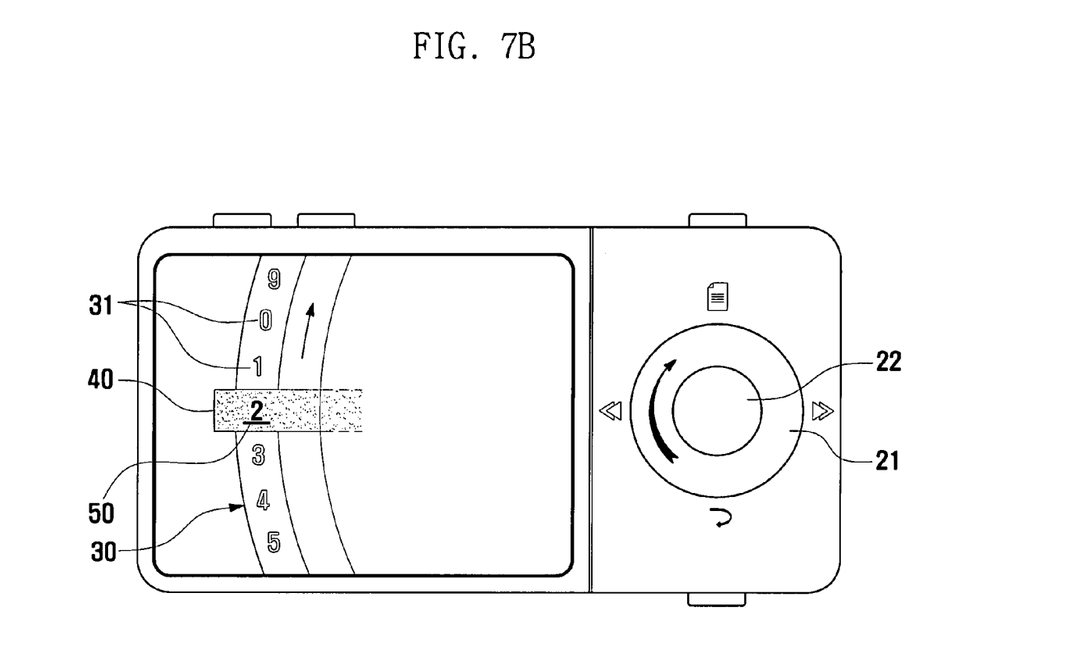
Figure 7C:
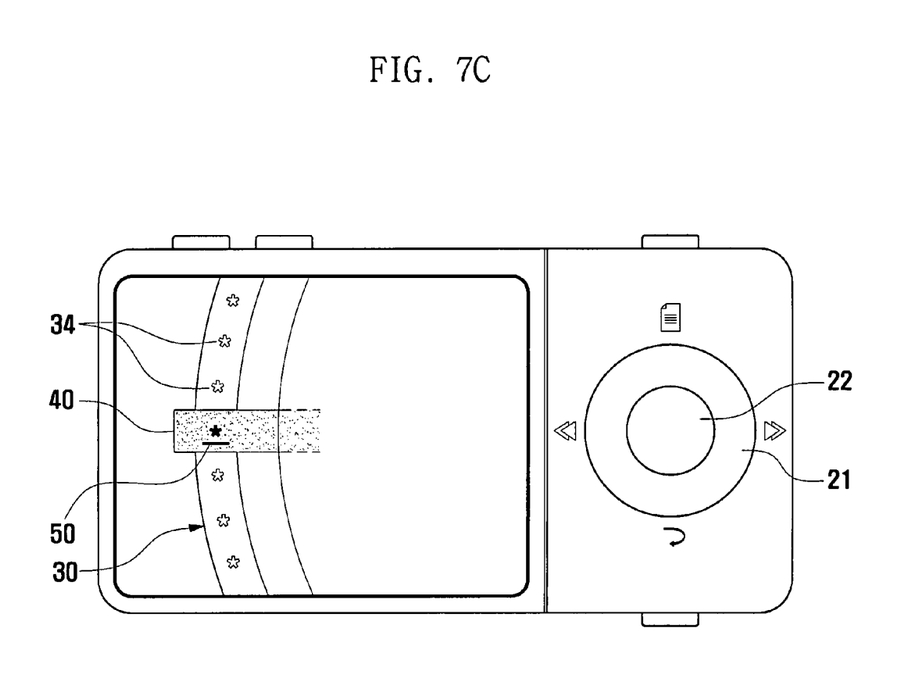

Subsequently, the screen highlight 40 is located at the desired virtual key 31 by rotating the wheel key 21 as shown in FIG. 7B. If a predetermined time (for example, 1 second) elapses after stopping the rotation of the wheel key 21, all of the virtual keys 31 are changed to a hidden character symbol 34 (for example, '*') as shown in FIG. 7C. The virtual keys 31 are preferably displayed only while the wheel key 21 moves to prevent a secret code or a password from being exposed to other people.

Figure 7D:
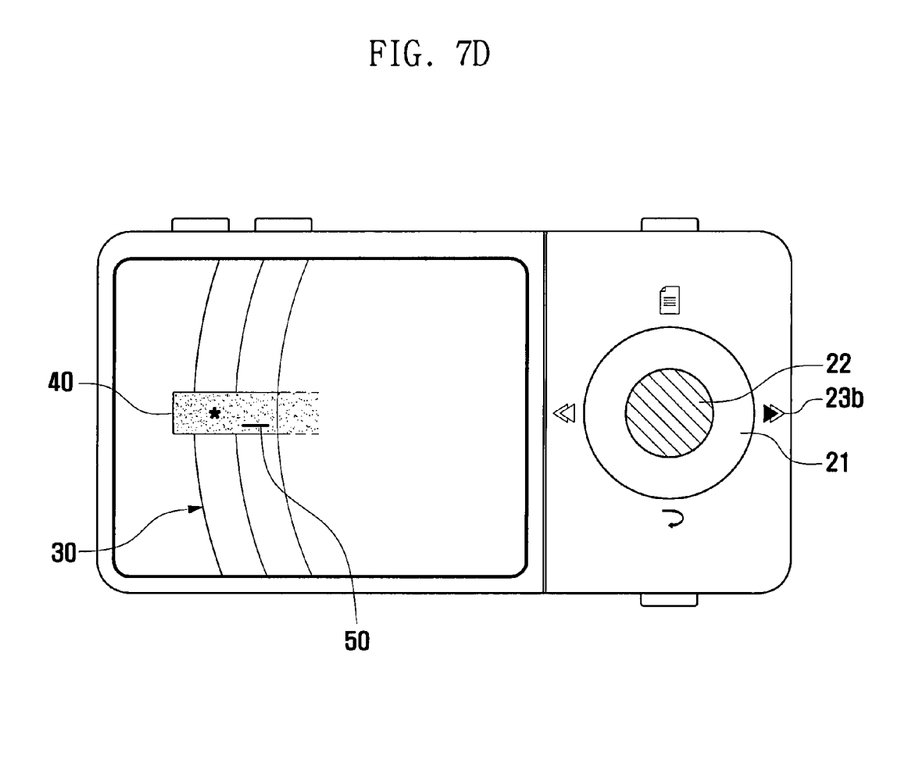

As shown in FIG. 7D, the virtual key 31 in the screen highlight 40 is input by pressing the selection key 22 or right navigation key 23b, and the cursor 50 moves to the next input position. If the wheel key 21 rotates again after moving the cursor 50, the virtual keys 31 are displayed again at the second input position.

As described above, a mobile terminal having a wheel input unit according to the present invention provides a virtual keypad for inputting a character in a wheel form as a user interface. The virtual wheel interface structure is basically an interface structure having a list form. Accordingly, the present invention has an advantage that a character input function may be performed conveniently.

Additionally, the virtual wheel interface structure according to the present invention is consistent with the appearance of a mobile terminal having a wheel input unit, and may be synchronized with a wheel key by integrating visual environment. Accordingly, the present invention provides better recognition and ease of learning to a user.

Additionally, the user interface and character input methods according to the present invention may be extended to menus for message preparation and file management, and thereby extension ability and product competitiveness of a mobile terminal may be improved.

The virtual wheel interface structure and character input methods according to the present invention may be applied to various input methods such as a single-tap system, multi-tap system, dictionary system, and code system, and is more suitable for a mobile terminal having a display unit larger than a wheel input unit.

Although preferred embodiments of the present invention have been, described in detail hereinabove, it should be understood to those skilled in the art that many variations and modifications of the basic inventive concept herein described, are possible and will still fall within the spirit and scope of the preferred embodiments of the present invention as further defined in the appended claims.

What is claimed is:

1. A virtual wheel interface structure of a mobile terminal comprising:
   a display unit formed in a first area of the mobile terminal;
   a wheel input unit formed adjacent to the display unit in a second area of the mobile terminal and having a rotatable wheel key, a selection key disposed in the center of the wheel key, and navigation keys disposed around the wheel key;
   a virtual wheel keypad having a plurality of virtual keys disposed in a rotational direction of the wheel and displayed on the display unit in a wheel form corresponding to a portion of the wheel key;
   a screen highlight displayed at a specific position on the virtual wheel keypad of the display unit and indicating a selection status of a virtual key; and
   a cursor displayed on the display unit and indicating a character input position,
   wherein the virtual wheel interface structure is configured to be converted between an input mode and a cursor mode,
   in the input mode, the virtual wheel keypad rotates according to rotation of the wheel key, the screen highlight is displayed at a specific position on the virtual wheel keypad, a virtual navigation key is displayed in a direction of a location of the cursor, and when a navigation key of the wheel input unit which is disposed in a direction toward the cursor is input, the virtual wheel interface structure is converted to the cursor mode, and
   in the cursor mode, the cursor moves according to rotation of the wheel key, the screen highlight disappears from the specific position on the virtual wheel keypad, the virtual navigation key is displayed in a direction of a location of the virtual wheel keypad, and when a navigation key of the wheel input unit which is disposed in a direction away from the cursor is input, the virtual wheel interface structure is converted to the input mode.

2. The virtual wheel interface structure of claim 1, wherein the cursor is located outside the virtual wheel keypad.

3. The virtual wheel interface structure of claim 1, wherein the cursor is located inside the screen highlight.

4. The virtual wheel interface structure of claim 1, wherein the first area is larger than the second area.

5. The virtual wheel interface structure of claim 1, wherein the virtual wheel keypad is displayed on a partial area of the display unit, adjacent to the wheel input unit.

6. The virtual wheel interface structure of claim 1, wherein the plurality of virtual keys are divided into a plurality of types.

7. The virtual wheel interface structure of claim 6, wherein the type comprises upper case characters, lower case characters, numbers, and symbols.

8. The virtual wheel interface structure of claim 6, wherein the virtual wheel keypad comprises a plurality of tracks and the virtual keys of each type are disposed on different respective tracks.

9. The virtual wheel interface structure of claim 1, wherein one character is allocated to each virtual key.

10. The virtual wheel interface structure of claim 1, wherein a plurality of characters are allocated to each virtual key.

11. The virtual wheel interface structure of claim 1, wherein the virtual wheel keypad rotates in the clockwise or counter-clockwise direction corresponding to the rotation of the wheel key.

12. The virtual wheel interface structure of claim 1, wherein the screen highlight rotates in the clockwise or counter-clockwise direction corresponding to the rotation of the wheel key.

13. A character input method using a virtual wheel interface in a mobile terminal having a rotatable wheel key, a selection key disposed in the center of the wheel key, and navigation keys disposed around the wheel key, the method comprising:
    displaying a virtual wheel keypad on a display unit of the mobile terminal, wherein the virtual wheel keypad is formed in a wheel shape corresponding to a portion of the wheel key and has a plurality of virtual keys disposed in a rotational direction of the wheel;
    displaying a screen highlight at a specific position on the virtual wheel keypad to select one of the virtual keys and displaying a cursor at a specific position on the display unit to indicate a character input position;
    identifying whether the wheel key rotates;
    rotating the virtual wheel keypad corresponding to the rotation of the wheel key;
    selecting a virtual key located at the screen highlight from the virtual keys; and
    inputting a character allocated to the selected virtual key at the position of the cursor,
    wherein the virtual wheel interface structure is configured to be converted between an input mode and a cursor mode,
    in the input mode, the virtual wheel keypad rotates according to rotation of the wheel key, the screen highlight is displayed at a specific position on the virtual wheel keypad, and a virtual navigation key is displayed in a direction of a location of the cursor, and when a navigation key of the wheel input unit which is disposed in a direction toward the cursor is input, the mobile terminal converts current mode from the input mode to the cursor mode, and
    in the cursor mode, the cursor moves according to rotation of the wheel key, the screen highlight disappears from the specific position on the virtual wheel keypad, and the virtual navigation key is displayed in a direction of a location of the virtual wheel keypad, and when a navigation key of the wheel input unit which is disposed in a direction away from the cursor is input, the mobile terminal converts current mode from the cursor mode to the input mode.

14. The character input method of claim 13, wherein selecting of the virtual key includes identifying whether the selection key is pressed, and selecting the virtual key located at the screen highlight if the selection key is pressed.

15. The character input method of claim 13, wherein selecting of the navigation key includes identifying whether the navigation key is pressed, and selecting the virtual key located at the screen highlight if the selection key is pressed.

16. The character input method of claim 13, wherein selecting of the virtual key includes identifying whether a time period has elapsed since rotating the virtual wheel keypad, and selecting a virtual key located at the screen highlight if the time period is elapsed.

17. The character input method of claim 13, wherein displaying the virtual wheel keypad includes displaying the virtual wheel keypad in a partial area of the display unit adjacent to the wheel input unit.

18. The character input method of claim 13, wherein displaying the virtual wheel keypad includes displaying a plurality of tracks on the virtual wheel keypad, and disposing the virtual keys sorted by types on the plurality of tracks.

19. The character input method of claim 18, wherein the plurality of tracks are disposed in a wheel form adjacent to each other, and one track on which virtual keys that are currently activated as input subjects are located is displayed darker than all others of the plurality of tracks.

20. The character input method of claim 13, wherein displaying the cursor includes displaying the cursor outside the virtual wheel keypad.

21. The character input method of claim 13, wherein displaying the cursor includes displaying the cursor inside the screen highlight.

22. The character input method of claim 13, wherein inputting the character utilizes one of a single-tap system, a multi-tap system, a dictionary system, and a code system.

* * * * *